March 17, 1931. C. A. MORRIS 1,796,955
COPY ESTIMATOR'S SCALE
Filed Dec. 14, 1928
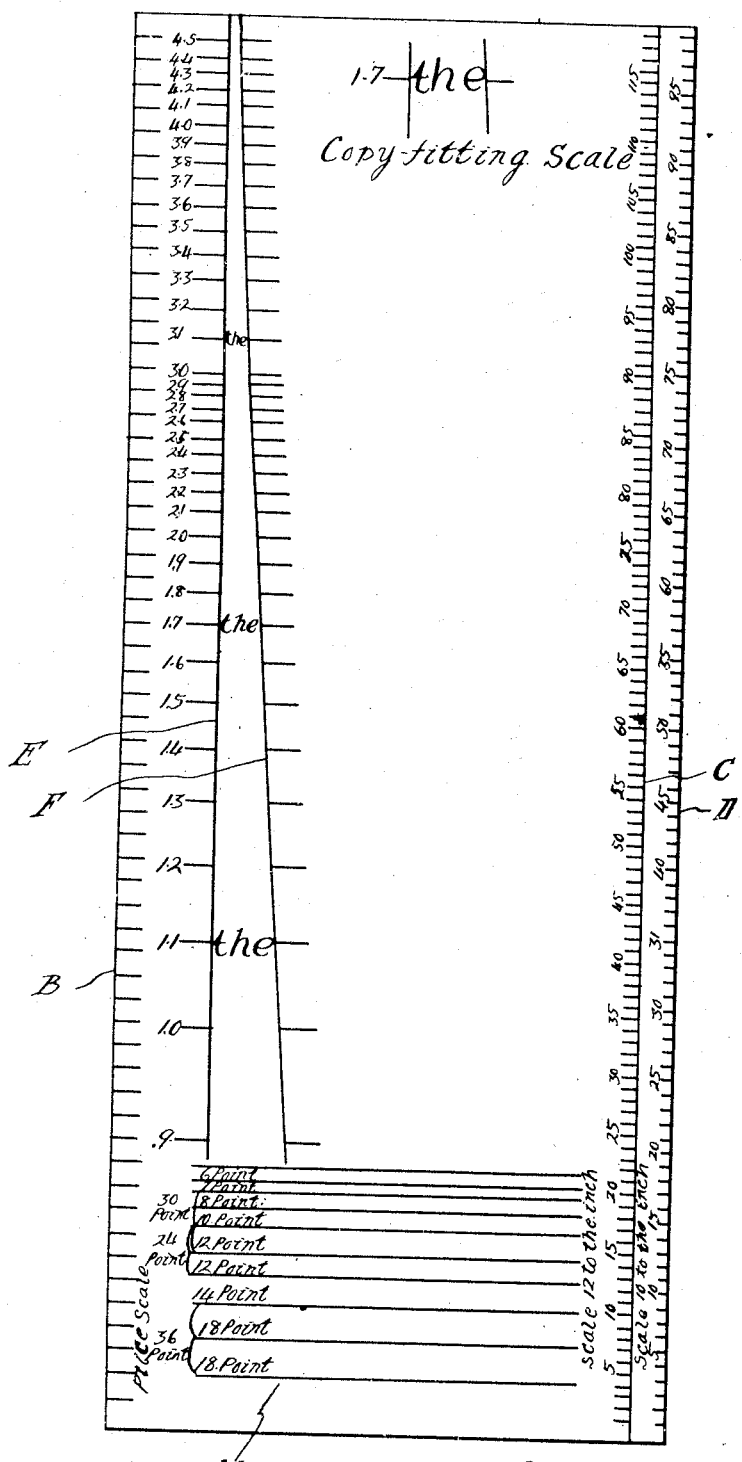
INVENTOR
Cedric A. Morris
BY
Swan Frye and Murray
ATTORNEYS Patented Mar. 17, 1931

1,796,955

UNITED STATES PATENT OFFICE

CEDRIC A. MORRIS, OF DETROIT, MICHIGAN

COPY-ESTIMATOR'S SCALE

Application filed December 14, 1928. Serial No. 326,066.

This invention relates to a copy estimator's scale, and has for its object a provision of a relatively simple device by means of which with a minimum of resultant calculation the approximate linear or page extent of a text printed in one kind or size of type may be extended as regards type of a different size or grade. With the competitive conditions prevailing within the printing trade where quick extension of costs and prices is necessary, as well as the necessity of estimating paper or page requirements for a text such as a court brief whose hasty production and filing is often necessary, my device forms a simple and accurate medium for arriving at the data desired; repeated tests under selected purposely variant conditions have shown the accuracy within a very small percentage of complications based upon the use of my improved device.

The single figure of drawing represents my device in elevation and preferably consists of a transparent sheet, such as either celluloid or glass, whereon are printed various markings and characters. The marginal marking B, at the left of the sheet as shown, represents a pica scale, whereas the series C and D along the right hand margin represent respectively typewritten type of the "elite" size and of the ordinary size. These latter vary from one another in the approximate proportion of twelve and ten, that is, twelve letters of the elite size occupy no more space along the typewritten line than ten of the ordinary size. The non-parallel lines E and F, which in the figure of drawing as represented occupy the intermediate portion of the sheet adjacent the pica scale edge, represent in the various spacings from one another at different points along their length, the linear space occupied by a selected group of letters thus constituting the word "the" being here selected for illustration, and intersecting these lines at various and variant points therealong are lines bearing notations indicating pica width at that point between the two lines. That is to say, the number of characters of any size type which can be accommodated between these lines when accurately placed thereover in the manner that the letters constituting the word "the" are shown at the top of the figure of drawing to be accurately bounded by the lines E and F at the points intersected by the pica measurement designated 1.7. It will be noted that while these lines E and F converge, they do not do so uniformly in that their upper ends representative in their spacings of the smaller sizes of type per pica unit, are more nearly parallel than those portions towards the bottom representing the larger pica units or grades.

If the sheet whereon this scale is printed were placed over a text whose extension of reproduction in another size of type is desired, the two lines E and F are moved upward or downward with the movement of the sheet until they accurately bound the letters selected as representative of the text as a whole. The nearest intersecting line, as for example 1.1 may thus be relied upon as an accurate representation of the number of characters of this type in one pica width. Multiplication of this number by any desired width of line in picas will give the number of characters which an average line of this width may be relied upon as comprising, and the multiplication of the resultant figures by the number of lines in the text will give the total number of characters contained in the text. The ascertainment of the total length of text in picas when composed in other types, is readily affected by dividing the measurement of the word "the" or other arbitrarily selected standard in the type under consideration into the total number of characters as ascertained above. The resulting number will indicate the total length of the text when set up in this type in picas, and a determination of the total number of lines required can be quickly arrived at by deciding the width of such lines in picas, and dividing such width into the total length in picas of the text.

To facilitate the ascertainment of the number of characters in a representative page of a submitted typewritten copy, a vertical line may be drawn to average the uneven termination of the lines at their right hand ends and the cross-wise extent between this line and the straight and aligned left hand ends of each line of the text may be measured by either one of the scales C or D (or such other scale as may be chosen in place of them) to ascertain the number of characters in a typewritten copy. This number of characters in a line, multiplied by the number of lines, gives the total number of characters in the entire text or copy. The type as thus measured may be correlated with the other factors already described in gauging the length of the copy when set up in type in any type face which it is desired to use.

Similarly the size of type may be ascertained by positioning the scale H over the type submitted in such a way that the space between them is just sufficient to accommodate the letters under measurement and may then be read as indications of what depth point of type is to be used. This, as determinative of the number of lines per page which it is proposed to print, furnishes the other determinative factor in estimating the total of text cooperatively with the variantly spaced lines already described.

What I claim is:

1. A copy estimator's scale, comprising a transparent sheet provided with selectively spaced non-parallel lines, the distance separating said lines being calibrated at determined intervals in correspondence with the number of characters per standard type unit which a representative test combination of letters will contain if encompassed thereby, wherefrom the number of characters in a line, or the expectable volume of any total text, may easily be derived.

2. A copy estimator's scale, comprising a transparent base provided with selectively spaced non-parallel lines, the component parts of one of which are of slightly angular relation to one another, the distance separating said lines being calibrated at determined intervals in correspondence with the number of characters per standard type unit which a representative test combination of letters will contain if encompassed thereby, wherefrom the number of characters in a line, or the expectable volume of any total text, may easily be derived.

3. A copy estimator's scale, comprising a transparent sheet provided with selectively spaced non-parallel lines, the component parts of one of which are themselves non-parallel, the distance separating said lines being calibrated at determined intervals in correspondence with the number of characters per standard type unit which an arbitrary test combination of letters will contain if encompassed thereby, such scale also containing parallel horizontal lines separated by varying vertical distances, each of which corresponds to a standard type size and is calibrated therewith, whereby said parallel lines enable the determination of the size of any given type, and said non-parallel lines enable the easy derivation of the number of characters in a line, or the expectable volume of any total text.

4. A copy estimator's scale, comprising a transparent sheet provided with selectively spaced non-parallel lines, the component parts of one of which occupy a slightly angular relation to one another, the distance separating said lines being calibrated at determined intervals in correspondence with the number of characters per standard type unit which a representative test combination of letters will contain if encompassed thereby, such scale also containing parallel horizontal lines separated by varying vertical distances, each of which corresponds to a standard type size and is calibrated therewith, said scale also containing a separate area marked with linear calibrations of standard type distances, whereby such linear calibrations enable the determination of lengths in picas, and other standard type distances, and whereby said parallel lines enable the determination of the size of any given type, and said non-parallel lines enable the easy derivation of the number of characters in a line, or the expectable total in the type selected of an offered test.

In testimony whereof I sign this specification.

CEDRIC A. MORRIS.